Nov. 19, 1940.   U. A. KEPPINGER   2,221,801
HOLDER FOR BROOMS AND THE LIKE
Filed March 29, 1938   2 Sheets-Sheet 2
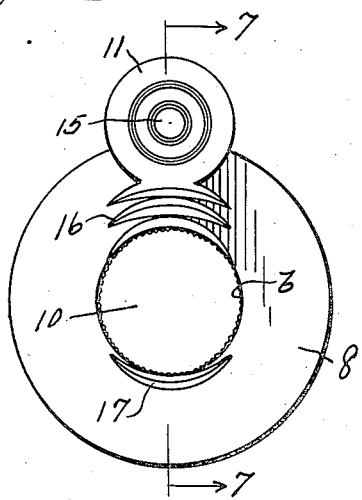
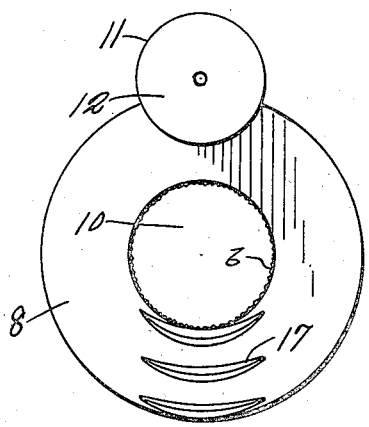
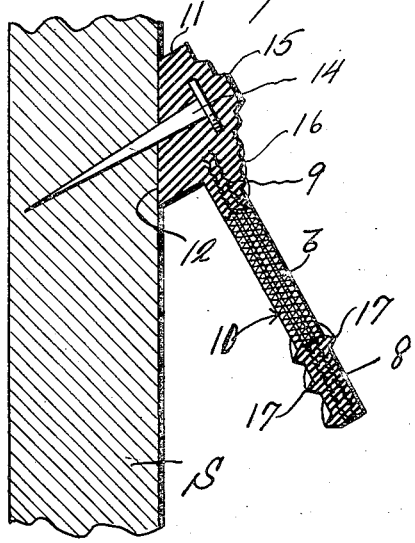
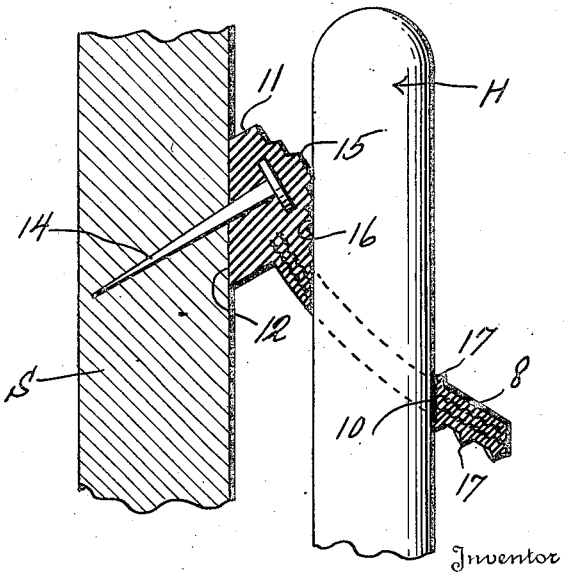

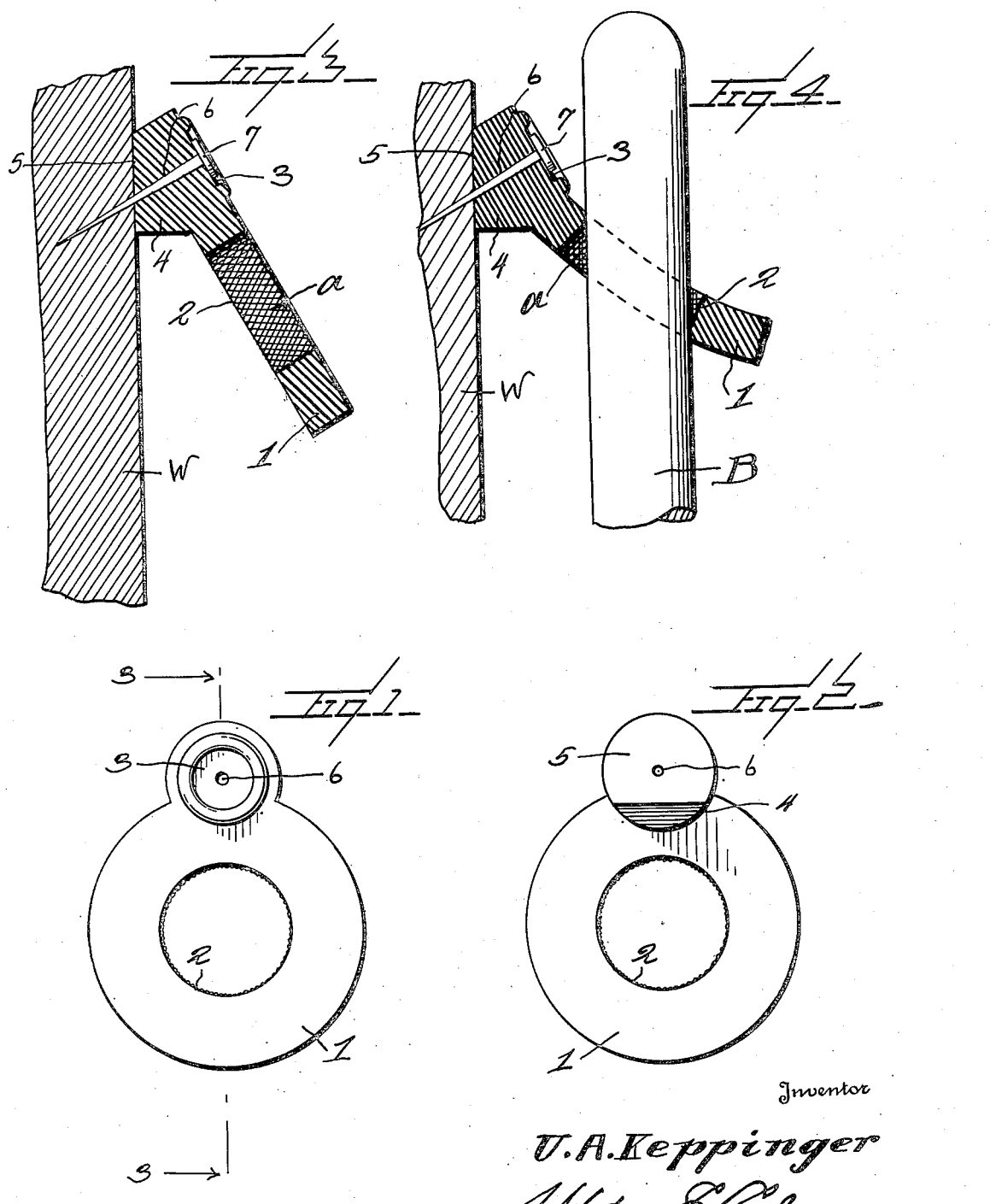

Patented Nov. 19, 1940

2,221,801

UNITED STATES PATENT OFFICE 2,221,801

HOLDER FOR BROOMS AND THE LIKE

Urban A. Keppinger, Portland, Oreg.

Application March 29, 1938, Serial No. 198,744

2 Claims. (Cl. 24—257)

This invention relates to a holder for a broom or the like, and it is primarily an object of the invention to provide a device of this kind formed from a rubber compound.

It is also an object of the invention to provide a device of this kind so constructed and formed to assure the device, when mounted upon a desired supporting surface, being in a position to effectively engage and hold the handle of a broom or the like.

Another object of the invention is to provide a simply constructed device which may be readily employed for suspending brooms, mops or like implements having handles of varying diameters without structural change in the device.

The invention consists in the details of construction and in the combination and arrangement of the several parts of my improved holder whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein—

Figure 1 is a view in top plan of a holder constructed in accordance with an embodiment of my invention;

Figure 2 is a view in bottom plan;

Figure 3 is a sectional view taken substantially on the line 3—3 of Figure 1 with the holder in applied position;

Figure 4 is a view similar to Figure 3 but showing a handle applied to the holder, said handle being in fragment;

Figure 5 is a view in top plan of a holder constructed in accordance with another embodiment of my invention;

Figure 6 is a view in bottom plan of the device as illustrated in Figure 5;

Figure 7 is a sectional view taken substantially on the line 7—7 of Figure 5 with the holder in applied position;

Figure 8 is a view similar to Figure 7 but showing a handle applied to the holder, said handle being in fragment.

My improved holder as illustrated in Figures 1 to 4 inclusive constitutes a unit formed from a suitable rubber compound or kindred material possessing a certain degree of inherent flexibility yet which normally maintains a fixed formation.

The device comprises an annular body 1 of rubber compound or similar material and of desired dimensions defining a central opening 2, the face $a$ of which is serrated or otherwise knurled or roughened. This body 1 is just thick enough so that the maintenance of the same normally in a flattened condition is assured, permitting the same to have a marked degree of flexure to facilitate its proper holding engagement with a broom handle B directed from below through the opening 2.

The body 1 has extending outwardly and radially therefrom a circular lug 3 integral therewith and the bottom face of this lug is provided with a projecting part 4 which extends a distance inwardly of the adjacent face of the body 1. This part 4 is integral with the lug 3 and body 1. The outer face 5 of this part 4 is flat and is inclined inwardly and outwardly from the outer end of the lug 3 on an angle of approximately forty-five degrees with respect to the adjacent inner or under face of the body 1.

In applying the device to a wall W or other suitable support, the face 5 is placed against such wall or support thus assuring the body 1 being disposed downwardly on an effective angle for proper coaction with the broom handle B. Disposed through the lug 3 and the part 4 is an opening 6 through which is adapted to be inserted a headed fastener 7 which penetrates the wall W or the like and thus effectively maintaining the device in applied or working position.

My improved device in its entirety may be molded as a single unit or the body 1 and lug 3 may be molded separately. It is also to be understood that in referring to my improved device as a broom holder it can be employed with equal facility in connection with a mop, duster, plumber's friend, or any device including a relatively long handle proper.

It is also believed to be obvious that my improved holder is noiseless and that it will not mar the paint or other finish on the surface of a handle. Furthermore, it is to be particularly pointed out that when my improved device is in applied or working position it will not injure anyone who might accidentally come in contact with the same.

In practice it is also preferred that the device be positioned at a relatively high elevation as no more than an inch of the handle of the broom or the like need be inserted up through the central opening 2.

While I have hereinbefore stated that the outer face 5 of the projecting part 4 of the lug is on an angle of approximately forty-five degrees, it is believed to be obvious that this angle of inclination may be varied in accordance with the preferred angle of projection of the device with respect to the wall or support to which it may be attached.

In the embodiment of the invention as illustrated in Figures 5 to 8 inclusive, the annular body 8 has embodied therein a reinforcement 9 of canvas or other suitable material, said reinforcement providing means at the face b defining the central opening 10 to assure further effective engagement of the holder with the handle H inserted therethrough.

In referring to the canvas reinforcement or lamination 9 it is to be understood that this is to be considered as a general term covering the use of cork, ground cotton fibers or such other materials which can be used with equal advantage to facilitate the gripping action upon the handle.

The body 8 has extending outwardly and radially therefrom a circular lug 11, the outer face 12 of which is inclined inwardly and outwardly from the outer end of the lug 11 on a desired angle and preferably approximately forty-five degrees with respect to the adjacent inner or under face of the body 8.

Embedded within this lug 11 at substantially the axial center of the face 12 is the headed end portion of an elongated penetrating member 14 adapted to be engaged with a supporting structure S to hold the device effectively in applied or working position. The outer face of the lug 11 is stepped, as at 15, or otherwise suitably formed so that said lug 11 may be properly impacted by a hammer or other desired tool for causing the member 14 to penetrate the support.

The outer face of the member 8 between the central opening 10 and the lug 11 is formed with the outstanding ribs 16. These ribs 16 together with the adjacent stepped portion 15 of the lug 11 provide further means to assure effective holding or gripping action of the device upon the handle H inserted therethrough as is particularly illustrated in Figure 8. It is to be noted that the lug 11 extends partly under the annular member 8. This is to reinforce the annular member 8 particularly when such member is bent or flexed upwardly to receive the handle H and, furthermore, to establish the angle at which the member 8 is to project from its wall or support S.

The lower portion of the annular member 8 or that portion remote from the lug 11 is provided on its upper or lower surface with the outstanding ribs 17. These ribs 17 are so positioned and arranged to facilitate the gripping and removal of the handle H. At this time it is to be stated that in connection with both of the embodiments of my invention only the use of one hand is necessary in placing the handle in the holder or removing the same therefrom.

From the foregoing description it is thought to be obvious that a holder for a broom or the like constructed in accordance with my invention is particularly well adapted for use by reason of the convenience and facility with which it may be assembled and used, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. As a new article of manufacture, a holder for a broom or the like comprising an annular rubber body for attachment to a vertically disposed surface, said rubber body being of sufficient rigidity to normally maintain a substantially flat formation, the handle of the broom or the like being insertible from below through the opening defined by the annular member, an outstanding lug carried by a marginal portion of the body, the outer face of the lug being substantially flat and disposed on an outward incline with respect to the rubber body from the outer end of the lug toward the body, said outer face of the lug having direct contact with the supporting surface to which the holder is to be attached, and fabric reinforcement within the rubber body, said reinforcement being exposed through the wall of the central opening of the rubber body to increase the gripping contact of such wall with the handle of the broom or the like inserted through the central opening of the body.

2. As a new article of manufacture, a holder for a broom or the like comprising a normally flat body for attachment to a vertically disposed surface, said yieldable body being of sufficient rigidity to normally maintain a substantially flat formation, said body having an opening through which the handle of the broom or the like is to be inserted from below, an outstanding lug carried by a marginal portion of bottom face of the body, the outer face of the lug being substantially flat and disposed on an outward incline with respect to the bottom face of the body from the outer end of the lug toward the body, said outer face of the lug having direct contact with the supporting surface to which the holder is to be attached, the top face of the body between the lug and the opening being provided with a series of ribs in stepped relation with the lower rib adjacent to the opening, said ribs being for contact with the handle member of the broom or the like inserted through the opening of the body.

URBAN A. KEPPINGER.